H. L. TANNER.
TELEMETRIC DEVICE.
APPLICATION FILED JUNE 7, 1918.
1,350,345.
Patented Aug. 24, 1920.
3 SHEETS—SHEET 1.
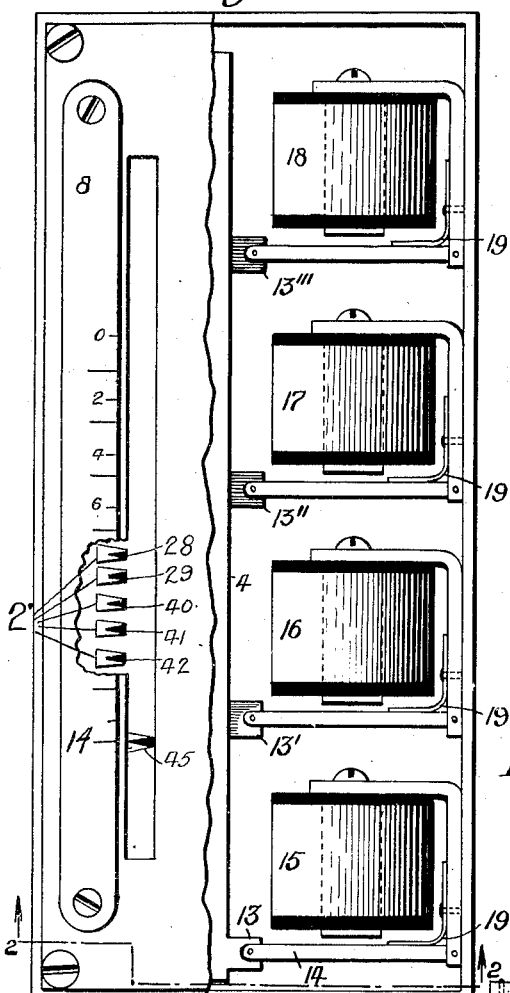
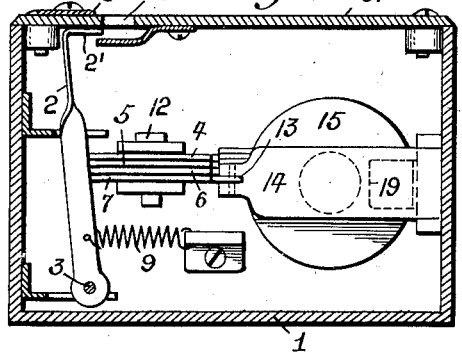
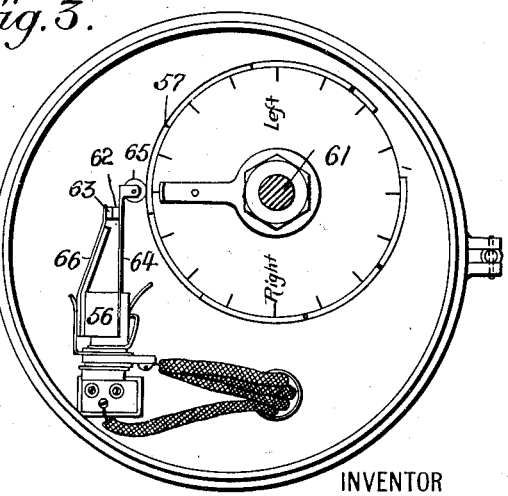
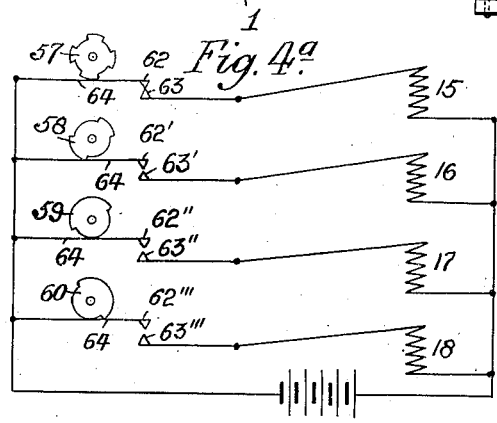
INVENTOR
HARRY L. TANNER.
BY
Herbert H. Thompson
his ATTORNEY.

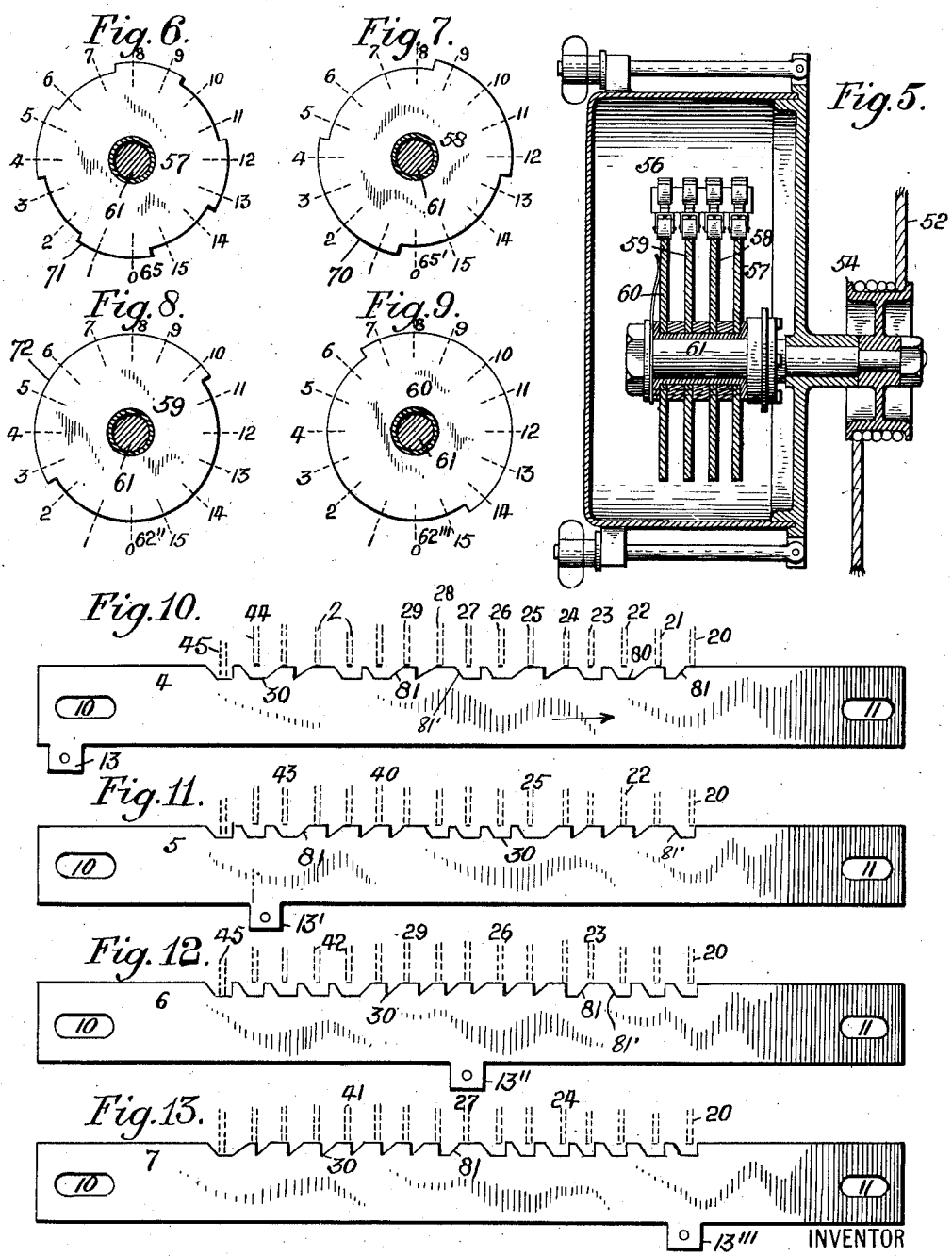

H. L. TANNER.
TELEMETRIC DEVICE.
APPLICATION FILED JUNE 7, 1918.

1,350,345.

Patented Aug. 24, 1920.
3 SHEETS—SHEET 3.

INVENTOR

HARRY L. TANNER
BY
Herbert H. Thompson
ATTORNEY

UNITED STATES PATENT OFFICE.

HARRY L. TANNER, OF BROOKLYN, NEW YORK, ASSIGNOR, BY MESNE ASSIGNMENTS, TO TANNER ENGINEERING COMPANY, INC., OF BROOKLYN, NEW YORK.

TELEMETRIC DEVICE.

1,350,345.  Specification of Letters Patent.  Patented Aug. 24, 1920.

Application filed June 7, 1918. Serial No. 238,747.

*To all whom it may concern:*

Be it known that I, HARRY L. TANNER, a citizen of the United States of America, residing at 1144 East 19th street, Brooklyn, in the county of Kings and State of New York, have invented certain new and useful Improvements in Telemetric Devices, of which the following is a specification.

This invention relates to systems of repeating at a distance the movements of an indicator or other member such as a watergage, a ship's rudder or compass, or other telemetric device.

More particularly the invention is an improvement of the signaling system disclosed in my patent for improvements in indicators, No. 1,320,807 dated November 4, 1919.

Referring to the drawings in which, what are now considered the preferred form of my invention are shown:

Figure 1, is a front elevation, with part of the cover broken away, of an indicator constructed according to my invention.

Fig. 2 is a sectional view taken approximately on line 2—2 of Fig. 1.

Fig. 3 is an elevation of a transmitter used to actuate the indicator of Fig. 1.

Fig. 4 is a diagrammatic elevation of a water tank or reservoir, showing the transmitter in place.

Fig. 4ᵃ is a wiring diagram illustrating the simplicity of connections employed.

Fig. 5 is a sectional view of the interior of the transmitter.

Fig. 6 is a front view of one of the cams on the transmitter.

Figs. 7, 8, and 9 are similar views of the other cams of the transmitter.

Fig. 10 is a detail of one of the slides in the indicator of Fig. 1.

Figs. 11, 12 and 13 are similar views of the other slides.

Figure 14:
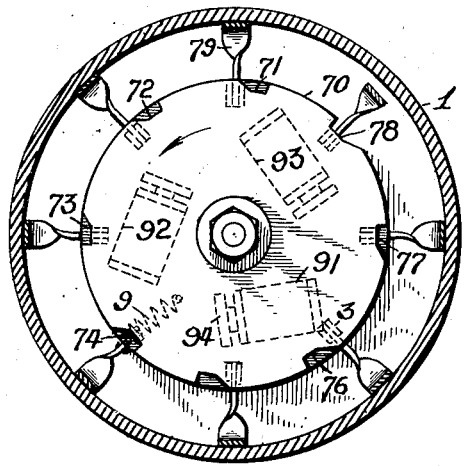

Fig. 14 is a sectional view of a modified form of instrument adapted for use as a ship's rudder indicator or the like.

Figure 15:
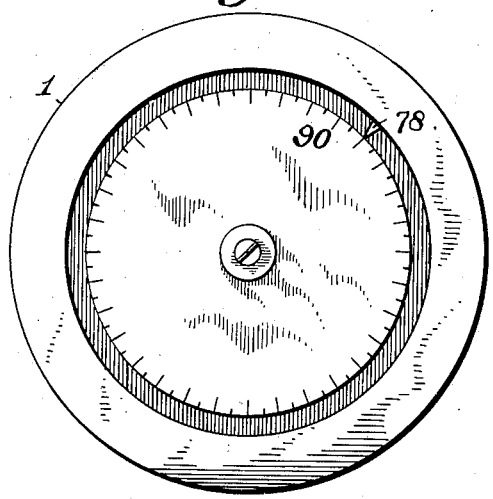

Fig. 15 is a plan view of the same.

Figure 16:
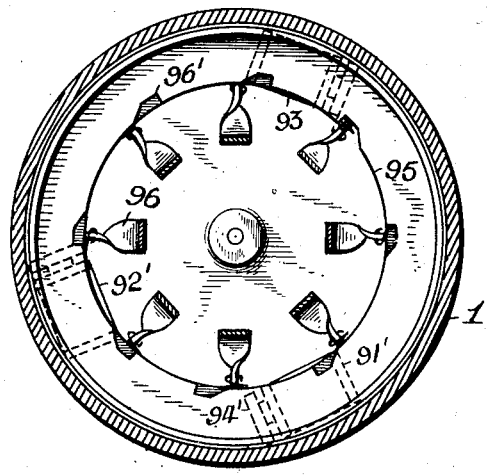

Fig. 16 is a sectional view of a second modified form of instrument.

Figure 17:
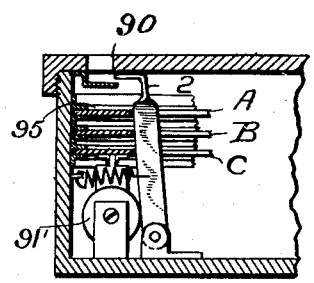

Fig. 17 is a vertical section of the same.

In Figs. 1 and 2, the indicator is shown as inclosed within a casing 1 in which are movably mounted a plurality of indicating elements. Said elements may assume the form of index pointers 2 in the form of sheet metal members having angularly disposed feet 2'. Said members may be pivoted within the casing at 3 and are normally held with the feet 2' in an inoperative or invisible position by abutting against one or more edges of the permutation members or slides 4, 5, 6 and 7. Said pointers are adapted to coöperate with a scale 8 or other indications on the face of said indicator so as to point to a given number on the scale, when moved to a visible position beneath slot 80 in cover 81. In the specific embodiment shown there are fifteen pointers, one for each mark on the scale including 0, and the last pointer 45 is shown as indicating division fourteen on the scale.

Each pointer is yieldingly pressed toward the slides by a spring 9, the movement of the pointers or indicators being controlled entirely by the movement of the slides, but many less slides being employed than indicators. The slides may be superimposed and mounted for limited longitudinal movement by having alined slots 10 and 11 adjacent either end through which pins 12 are adapted to extend. Each slide is shown as provided with a lug 13, 13', 13" and 13''' to which a pivoted arm 14 is pivotally attached. Each arm may act as the armature of one of electro-magnets 15, 16, 17 or 18, the armatures being normally held downwardly by leaf springs 19. When a magnet is excited the adjacent arm is moved upwardly thereby moving the attached slide a step. Obviously any other suitable actuating means for the slides may be employed.

Each slide is provided with serrations or notches 30 of varying characteristics or locations. In general the notches are arranged with reference to each pointer 2 such that normally, at least one of the slides has a raised portion under the adjacent pointer while the remaining slides have notches under said pointer. Thus pointer 20 (Figs. 10 to 13) has a notch in slides 5, 6 and 7 thereunder, but slide 4 has a raised portion at this point, so that to actuate said pointer movement of slide 4 to the right is required. But certain of said pointers have more than one raised portion thereunder, so that movement away from their normal position of more than one slide is required. Thus to move pointer 21 requires the movement of slides 4 and 5, and to move pointer 23, slides 5 and 6 should be moved, but pointer 22 requires the movement of only slide 5. To move pointer 24, all of slides 4, 5 and 6 need to be moved, since only slide 7 has a notch adjacent said slide. The number of pointers it is possible to actuate with a given number of primary moving slides is the number of combinations possible of that number, as explained in my aforesaid application. In the illustration shown there are 15 pointers possible or with $n$ slides, there are $$n + \frac{n(n-1)}{2} + \frac{n(n-1)(n-2)}{2.3} \ldots \text{ to } n \text{ terms}$$

or expressed in simpler terms $2^n - 1$, if the zero position is not counted. In addition there is of course the closed or inoperative position in which none of the indicators are visible. The individual pointers 2 are numbered 20 to 45.

It should be noted that certain of the notches 30 in the slides are provided with inclined edges 81. Such off edges are for the purpose of moving the pointer out of the notch when the slide moves back to its normal position. Said surface obviously need be provided in only that slide or slides which is or are moved to allow the pointer to drop in the notch. Where two or more notches coincide they of course appear as one notch of twice the breadth, while where 2 or more raised portions or teeth coincide they appear as one elongated tooth. It should be observed that some of the advancing edges 81' are inclined reversely to off edges 81. I find this important in rendering the exhibitor capable of moving from each position to the next position without returning to the zero or off position. In other words, assuming that the slides in Fig. 10 are movable in the direction of the arrow, inclined off edges 81 would be brought into play to return the actuated indicator upon return of the slide or slides. If, however, the next position required not the return of one of the moved slides, but the initial movement of another slide, it would be necessary to return the first indicator. This function is performed by an advancing inclined edge 81'.

As above stated, one use of my indicator is for transmitting to a distance the level of water in a reservoir or tank. In Fig. 4, a water tank is represented at 50, there being a float 51 suspended therein by a rope 52. Said rope is shown as passing over pulleys 53 at the top of the tank and is connected in any manner to a drum 54 as by being coiled therearound. A counter weight 55 may be secured to the free end of said rope, if desired. The transmitter 56 is shown as of the cam type, the cams 57, 58, 59 and 60 being shown as mounted on the shaft 61 of drum 54. Each cam is provided with one or more raised portions and one or more depressed portions, the raised portions being adapted to hold the contact point 62 of the adjacent switch against the complemetary point 63. Point 62 in each instance is mounted on a leaf spring 64 on the end of which is journaled a roller 65 which bears on the cam. The other contact point is mounted on a complementary spring portion 66. It will be readily apparent that as a depressed portion in the adjacent cam comes under the roller the switch will be opened by the resilient action of the leaf spring 64. The cams are so arranged upon the shaft that the contacts will be closed as the shaft is rotated in such sequence as to cause the pointers to be actuated in succession. Thus in the position of the cam illustrated in Figs. 6 to 9, the switch points 62 and 63 will be closed if the roller 65 bears on the cam 57 at 0 while the remaining switch points 62', 62'', 62''' are open. As will be seen in Fig. 4ª, switch 62—63 is connected to magnet 15 actuating slide 4 so that pointer 20 will indicate the zero position. Upon a slight turn, i. e., 22°—30' in a counter-clock-wise direction, which is represented by position 1 on the cams the high portion 70 of cam 58 will be brought under the roller 65' of said cam and switch 62' and 63' closed. At the same time switch 62 and 63 will remain closed and thereby slide 5 will be moved and slide 4 remain in the advanced position. As explained above this will cause the pointer 21 to become visible while pointer 20 is again hidden. Upon a further 22°—30' movement the raised portion 71 of cam 57 will move from under the roller 65 (position 2 of the cams) thereby deënergizing magnet 15 and allowing slide 4 to return to its normal position, slide 5 remaining however in its advanced position. This, as explained, will cause pointer 22 to become visible and render pointer 21 invisible. Similarly a further 22°—30' movement will cause the high portion 72 of cam 59 to close the adjacent switches 62'' 63'', switch 62', 63' remaining closed (position 3). This, as is readily apparent, will cause pointer 23 to become visible. Similarly the next 22° 30' movement will cause the closing of switches 62, 63, 63', 62', 62'', 63'' (position 4) causing the movement of pointer 24 and similarly with the rest of the fifteen positions as indicated. By designing the cam in this manner it is possible to move only one slide at a time in actuating the fifteen different pointers, although only four slides are employed. By this means certain electrical and mechanical advantages are obtained, in that not more than one circuit is made or broken at one time. With the cams in position 15, all the switches are open and hence the pointer 45 is actuated to indicate number 14.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

It is of course obvious that the movable members 4, 5, 6 and 7 instead of being in the form of slides, may be made in the form of disks having notches in their peripheries. It is also of course obvious that any number of movable elements may be employed in carrying out my invention depending upon the number of indications desired. In Figs. 14 and 15 is shown a modification employing three rotatable disks 70, each disk having eight notches. This form of the invention is applicable to a rudder indicator, the transmitter being connected to the rudder. The uppermost disk is shown as having notches 71 to 78, the notches corresponding in function to the notches in slide 4 figuring from the right-hand end of the slide, but including the off position. The notches 78 when alined cause the off position to be indicated by moving pointer 79. The movable fingers 79 are shown arranged symmetrically around the periphery of the disks and are readable on a circular scale 90 as will be readily apparent. Each disk is moved by an electro-magnet 91, 92 and 93, the electro-magnets acting upon armatures 94 secured to the respective disks. The disks are designed to be moved in the direction of the arrow for actuating the pointers, the notches being so arranged that only one disk is moved at a time in stepping from one position to another around the circle. The following is the sequence of movements of the disks in order to actuate the pointers of either Fig. 14 or 15 in a counter clockwise direction beginning at the top with pointer 79, the top slide being lettered A, the middle slide B and the lower slide C: position 1, disk A; position 2, A and B; position 3, B; position 4, B and C; position 5, A, B and C; position 6, A and C; position 7, C; position 8, off. A somewhat similar arrangement is shown in Figs. 16 and 17 in which the disks are shown in the form of rings 95 having notches 96 on their inner peripheries. The movable pointers 96 in this instance are pivoted inside the rings as shown in Fig. 17 and are pressed against the edges of the rings by springs 97. As before the rings are rotated by electro-magnets 91' severally or in groups to actuate the pointers.

Having described my invention, what I claim and desire to secure by Letters Patent is:

1. In a changeable exhibitor, a plurality of movable permutation elements, a plurality of notches in each element, the notches in the elements being differentially arranged, a plurality of normally invisible indicating members biased toward said elements, and means for moving said elements to cause said members to advance selectively into said notches to render visible an indication.

2. In indicating means for the level of water comprising a float, a transmitter connected thereto so as to be actuated on movement of the float, electro-magnetically movable permutation parts actuated from said transmitter, and a plurality of indicators of a greater number than said parts actuated by individual and combined movements of said parts.

3. A changeable exhibitor comprising a series of fixed indications, a plurality of movable reference elements adapted to co-operate therewith, a lesser number of actuating permutation members for said elements and means for moving said members in such manner that each element is actuated in a predetermined sequence.

4. In a repeating system, a transmitter for closing each circuit alone and in combination with each of the other circuits in a predetermined sequence such that not more than one circuit is made or broken at one time, in combination with a receiving instrument having an electro-magnetic device in each of said circuits, and a plurality of indicating members actuated by movement of said devices both individually and in combination.

5. A changeable exhibitor comprising a series of fixed indications, a plurality of normally invisible pointers adjacent the several indications, a lesser number of slides having serrations therein for the pointers movably mounted adjacent said pointers, said serrations being so arranged that the pointers may be moved in sequence by given movements of the slides individually and in groups, and means for so actuating the slides.

6. In a changeable exhibitor, a plurality of movable permutation elements, a plurality of notches in each element, the notches in the elements being differentially arranged and having one or both edges inclined, a plurality of normally invisible indicating members biased toward said elements, and means for moving said elements to cause said members to advance selectively into said notches whereby successive positions may be assumed by said members without resetting all of said members.

7. A changeable exhibitor comprising a series of fixed indications, a plurality of normally invisible pointers adjacent the several indications, a lesser number of slides having serrations therein for the pointers movably mounted adjacent said pointers, certain of said serrations having their off edges inclined while certain thereof have their advancing edges inclined for the purpose specified.

In testimony whereof I have affixed my signature.

HARRY L. TANNER.